US012327031B2

(12) United States Patent
Muthya Narahari et al.

(10) Patent No.: US 12,327,031 B2
(45) Date of Patent: Jun. 10, 2025

(54) COMPACTION OF A LOGICAL-TO-PHYSICAL TABLE FOR ZONED NAMESPACE NONVOLATILE MEMORY

(71) Applicant: Western Digital Technologies, Inc., San Jose, CA (US)

(72) Inventors: Avinash Muthya Narahari, Bangalore (IN); Rajthilak Dasarathan, Tiruchirappalli (IN)

(73) Assignee: Sandisk Technologies, Inc., Milpitas, CA (US)

( * ) Notice: Subject to any disclaimer, the term of this patent is extended or adjusted under 35 U.S.C. 154(b) by 378 days.

(21) Appl. No.: 17/900,276

(22) Filed: Aug. 31, 2022

(65) Prior Publication Data

US 2024/0069775 A1    Feb. 29, 2024

(51) Int. Cl.
*G06F 3/06*    (2006.01)

(52) U.S. Cl.
CPC ............ *G06F 3/064* (2013.01); *G06F 3/0604* (2013.01); *G06F 3/0652* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,339,865 B2 | 12/2012 | Lavan et al. | |
| 10,915,475 B2 | 2/2021 | Dubey et al. | |
| 10,990,526 B1 | 4/2021 | Lam et al. | |
| 11,055,230 B2 | 7/2021 | Haswell | |
| 11,200,162 B2 | 12/2021 | Helmick et al. | |
| 2017/0153825 A1 | 6/2017 | Cho et al. | |
| 2021/0294752 A1 | 9/2021 | Palmer | |
| 2021/0374067 A1 | 12/2021 | Helmick et al. | |
| 2022/0244869 A1* | 8/2022 | Kanteti | G06F 3/0631 |
| 2023/0075329 A1* | 3/2023 | Surianarayanan | G06F 3/0653 |
| 2023/0103355 A1* | 4/2023 | Surianarayanan | G06F 3/064 |
| | | | 711/158 |
| 2023/0168826 A1* | 6/2023 | Agarwal | G06F 3/0679 |
| | | | 711/154 |
| 2023/0289078 A1* | 9/2023 | Wells | G06F 3/0604 |

OTHER PUBLICATIONS

NVM Express. Zoned Namespace Command Set Specification. Revision 1.1. May 18, 2021 (46 pages).

\* cited by examiner

*Primary Examiner* — Michael Alsip
(74) *Attorney, Agent, or Firm* — Michael Best & Friedrich LLP (57) ABSTRACT

A Zoned Namespace data storage device configured to perform logical-to-physical (L2P) address translation using first and second L2P tables of different respective granularities. In an example embodiment, the first L2P table has a finer (e.g., page-level) granularity and is used to perform L2P address translation for open zones. The second L2P table has a coarser (e.g., erase-block) granularity and is used to perform L2P address translation for finished zones. A controller of the data storage device performs granularity-changing transfers of L2P entries between the first and second L2P tables in response to a respective open zone becoming finished and in response to a new zone becoming open. The coarser granularity of the second L2P table enables the full L2P table to have a relatively small size, which can beneficially be used to make more space available in the same amount of RAM for other operations.

18 Claims, 5 Drawing Sheets

COMPACTION OF A LOGICAL-TO-PHYSICAL TABLE FOR ZONED NAMESPACE NONVOLATILE MEMORY

FIELD

This application relates generally to data storage devices, and more particularly but not exclusively, to logical-to-physical (L2P) address translation.

BACKGROUND

This section introduces aspects that may help facilitate a better understanding of the disclosure. Accordingly, the statements of this section are to be read in this light and are not to be understood as admissions about what is in the prior art or what is not in the prior art.

Flash-based data storage devices use L2P tables to translate logical addresses of input/output (I/O) requests to corresponding flash-memory addresses. The layer that performs the translation is referred to as the flash translation layer (FTL). Controllers of some data storage devices may have a random-access memory (RAM) of a constrained size, which may limit the maximum size of the L2P table that can be stored therein. This L2P size constraint can be particularly challenging for the implementation of higher-capacity data storage devices.

SUMMARY

Disclosed herein are various embodiments of a Zoned Namespace data storage device configured to perform L2P address translation using first and second L2P tables of different respective granularities. In an example embodiment, the first L2P table has a finer (e.g., page-level) granularity and is used to perform L2P address translation for open zones. The second L2P table has a coarser (e.g., erase-block) granularity and is used to perform L2P address translation for finished zones. A controller of the data storage device performs granularity-changing transfers of L2P entries between the first and second L2P tables in response to a respective open zone becoming finished and in response to a new zone becoming open. The coarser granularity of the second L2P table enables the full L2P table to have a relatively small size, which can beneficially be used to make more space available in the same amount of RAM for other operations.

According to an example embodiment, provided is a data storage device, comprising: a nonvolatile memory having a plurality of superblocks thereof mapped to a plurality of zones, each of the plurality of zones being of a type requiring sequential write of host data, an erase block being a minimum erasable unit of the plurality of superblocks; and a controller coupled to the nonvolatile memory and configured to perform L2P address translation using a first L2P table and a second L2P table; wherein the first L2P table includes one or more first L2P sub-tables, each of the one or more first L2P sub-tables having a first granularity and assigned to a respective open zone of the plurality of zones; wherein the second L2P table includes one or more second L2P sub-tables, each of the one or more second L2P sub-tables having an erase-block granularity and assigned to a respective full zone of the plurality of zones, the first granularity being finer than the erase-block granularity; and wherein the controller is configured to perform a compacting sub-table transfer from the first L2P table to the second L2P table in response to detecting a finishing of the respective open zone.

According to another example embodiment, provided is an address-translation method for a data storage device, the method comprising: mapping a plurality of superblocks of a nonvolatile memory of the data storage device to a plurality of zones, each of the plurality of zones being of a type requiring sequential write of host data, an erase block being a minimum erasable unit of the plurality of superblocks; performing L2P address translation using a controller coupled to the nonvolatile memory and further using a first L2P table and a second L2P table, the first L2P table including one or more first L2P sub-tables, each of the one or more first L2P sub-tables having a first granularity and assigned to a respective open zone of the plurality of zones, the second L2P table including one or more second L2P sub-tables, each of the one or more second L2P sub-tables having an erase-block granularity and assigned to a respective full zone of the plurality of zones, the first granularity being finer than the erase-block granularity; and performing, via the controller, a compacting sub-table transfer from the first L2P table to the second L2P table in response to detecting a finishing of the respective open zone.

According to yet another example embodiment, provided is an apparatus, comprising: means for mapping a plurality of superblocks of a nonvolatile memory to a plurality of zones, each of the plurality of zones being of a type requiring sequential write of host data therein, an erase block being a minimum erasable unit of the plurality of superblocks; means for performing L2P address translation using a first L2P table and a second L2P table, the first L2P table including one or more first L2P sub-tables, each of the one or more first L2P sub-tables having a first granularity and assigned to a respective open zone of the plurality of zones, the second L2P table including one or more second L2P sub-tables, each of the one or more second L2P sub-tables having an erase-block granularity and assigned to a respective full zone of the plurality of zones, the first granularity being finer than the erase-block granularity; and means for performing a compacting sub-table transfer from the first L2P table to the second L2P table in response to detecting a finishing of the respective open zone.

Various aspects of the present disclosure provide for improvements in data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are mere examples and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. Furthermore, it will be apparent to those of skill in the art that, although the present disclosure refers to NAND flash, the concepts discussed herein may be applicable to other types of solid-state memory, such as NOR, PCM ("Phase Change Memory"), ReRAM, etc.

Figure 1:
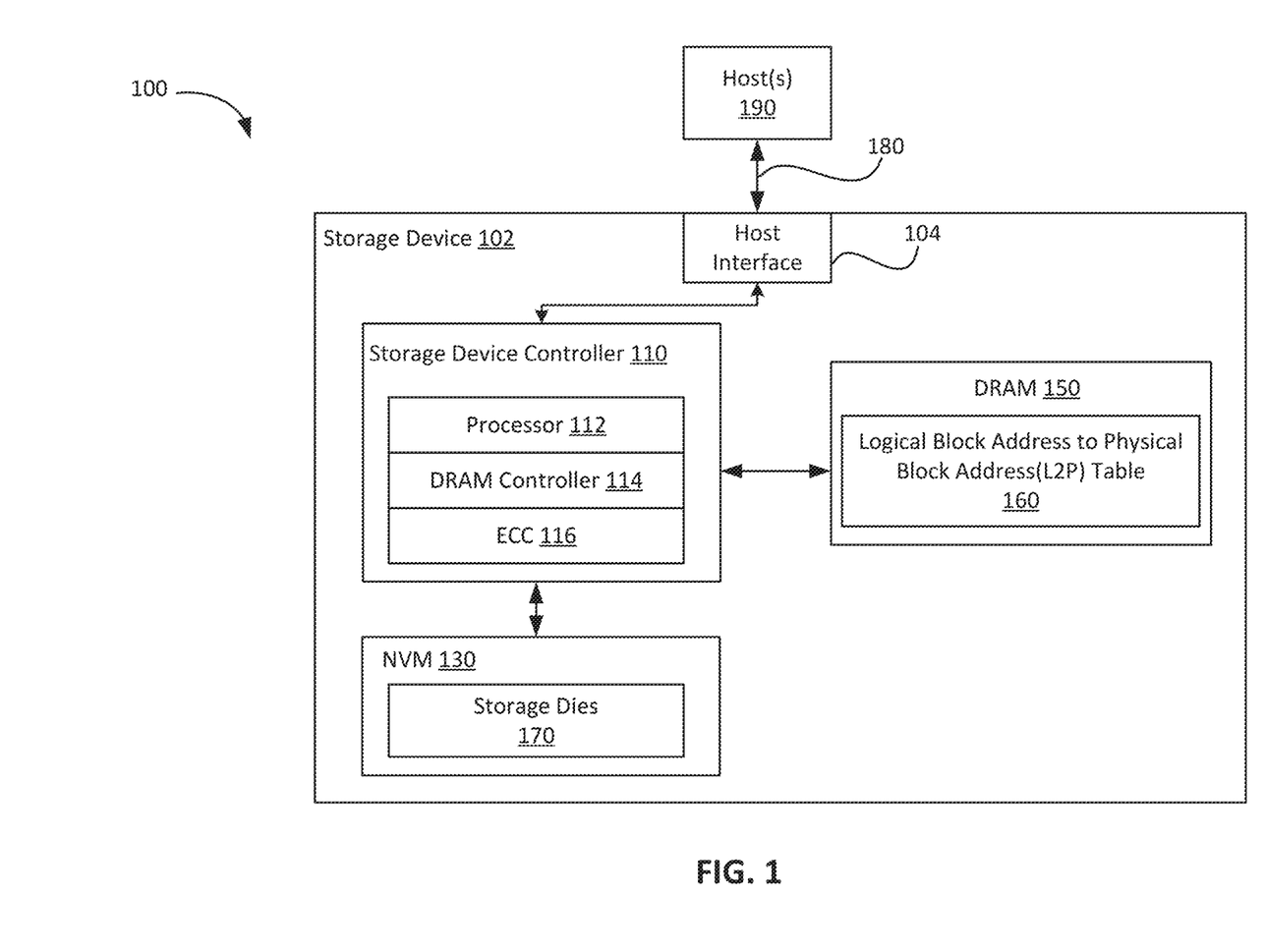
FIG. 1 is a block diagram illustrating a data-storage system in which various embodiments may be practiced.

FIG. 1 is a block diagram illustrating a data-storage system 100 in which example embodiments can be practiced. System 100 comprises a data storage device 102 connected to a host device 190 by way of a communication path 180. In an example embodiment, communication path 180 can be implemented using an electrical bus, a wireless connection, or any other suitable data link. Data storage device 102 can be a flash memory device, e.g., a solid state drive (SSD), a flash memory, or other suitable non-volatile memory (NVM).

In some embodiments, data storage device 102 may be embedded within host device 190. In some other embodiments, data storage device 102 may be removable from host device 190, e.g., may be removably coupled to host device 190 in accordance with a removable universal serial bus (USB) configuration. In some embodiments, data storage device 102 may be used as an embedded storage drive, e.g., a mobile embedded storage drive, an enterprise storage drive (ESD), a client storage device, a cloud storage drive, or other suitable data storage device.

As shown in FIG. 1, data storage device 102 comprises a host-device interface 104, an electronic controller 110, an NVM 130, and a volatile memory (e.g., a DRAM) 150. In operation, host-device interface 104 enables communications between data storage device 102 and host device(s) 190. Such communications may include, inter alia, transmission of data between NVM 130 and host device(s) 190. NVM 130 comprises storage dies 170, which may include any one type or any suitable combination of NAND flash devices, NOR flash devices, and other suitable non-volatile memory devices. Storage dies 170 may be organized into channels, each of the channels being based on a corresponding bus, e.g., an 8-bit bus, connecting the corresponding subset of storage dies 170 to controller 110. Individual ones of storage dies 170 may further be organized into a hierarchy of planes, blocks, and pages. NVM 130 and/or individual ones of the storage dies 170 thereof may also include support circuitry (not explicitly shown in FIG. 1), such as read and write circuitry. Such read/write circuitry may be implemented in a single component or may be divided into separate components, such as a read-circuitry component and a separate write-circuitry component. In an example embodiment, DRAM 150 is used, inter alia, to store an L2P table 160.

Controller 110 includes components, such as circuits, firmware, and software, that bridge NVM 130 to host-device interface 104, with only some of said components being explicitly shown in FIG. 1 for better clarity. For example, controller 110 may include: (i) an embedded processor 112; (ii) an electrically erasable firmware read-only memory (ROM, not explicitly shown in FIG. 1); (iii) a DRAM controller 114; (iv) an error-correction code (ECC) circuit or module 116; and (v) a flash component interface (not explicitly shown in FIG. 1). In some embodiments, controller 110 may also incorporate DRAM 150 or other functionally similar volatile-memory having stored therein the L2P table 160.

Processor 112 is configured to support, e.g., some or all of the following operations: wear leveling, bad-block management, data scrambling, error-correction coding, garbage collection, trim, address mapping, and other pertinent operations. DRAM controller 114 operates as an electronic controller of DRAM 150. ECC entity 116 may typically include two submodules, with a first of the submodules running a first ECC applied to data stored in NVM 130, and with a second of the submodules running a different second ECC applied to data stored in DRAM 150, including the data of L2P table 160 and other tables and/or control-data structures that may be stored therein.

Host device 190 may address data stored in NVM 130 using a logical address. However, the data are stored in NVM 130 at physical addresses. The L2P table 160 is used to map from the logical address used by host device 190 to the physical address where the data are actually stored in NVM 130. When host device 190 requests to read data, controller 110 may obtain the physical address from L2P table 160 to access the requested data. When host device 190 requests to write or update data in NVM 130, controller 110 may update L2P table 160 accordingly.

A master L2P table may be stored in NVM 130 but, to be efficiently used or updated by controller 110, at least a pertinent portion of the master L2P table is stored in DRAM 150, e.g., in L2P table 160. When L2P table 160 is updated, the updates need to be written back into the master L2P table stored in NVM 130. During the design process of data storage device 102, it may be stipulated whether DRAM 150 will be specified to hold a copy of the whole master L2P table for the entire logical address space. A decision to not hold the whole master L2P table in DRAM 150 may be due to, e.g., a size of DRAM 150. Similar design decisions may also be made with respect to other tables that may be used instead of, in addition to, or in conjunction with L2P table 160 according to various embodiments.

For illustration purposes and without any implied limitations, some example embodiments are described hereinbelow in reference to page-level L2P mapping. From the provided description, a person of ordinary skill in the pertinent art will readily understand how to make and use other embodiments, e.g., implementing selected block-level L2P mapping or other specific granularities of L2P mapping.

In some examples of page-level L2P mapping, a physical address may include a channel number, a die number, a block number, and a page number. For a 4-kB page size, a 32-TB NVM 130 may require approximately 32 GB of such L2P entries. With the added ECC overhead, this volume of L2P entries can be accommodated, e.g., by a 40-GB DRAM 150. This estimate of the DRAM capacity scales approximately linearly with the data capacity of NVM 130. Various embodiments disclosed herein can advantageously be used to reduce the actual capacity of DRAM 150 with respect to the linearly estimated DRAM capacity that is required without implementing the embodiments described herein. Various embodiments described herein can also advantageously be used to reduce the storage requirement to DRAM 150 with respect to the storage requirement that is needed without implementing the embodiments described herein.

Although FIG. 1 shows controller 110 as being connected to and employing DRAM 150, alternative embodiments are also possible. For example, in one such embodiment, controller 110 may employ, for similar functions, a built-in cache memory, e.g., a static random-access memory (static RAM or SRAM), which is a part of the controller circuitry. In another embodiment, instead of DRAM 150, controller 110 may use a dedicated portion of NVM 130 as storage for L2P table 160.

Some embodiments of data-storage system 100 comply with the NVM Express® Zoned Namespace (ZNS) Command Set Specification TP-4053, which is incorporated herein by reference in its entirety. This ZNS specification supplements the NVMe Base Specification which defines, inter alia, an interface for host software to communicate with the corresponding data storage device over a variety of memory-based transports and message-based transports. The ZNS specification defines additional data structures, features, log pages, commands, and status values. The ZNS specification also defines extensions to existing data structures, features, log pages, commands, and status values.

When operating in compliance with the ZNS specification, host device 190 and data storage device 102 collaborate on data placement such that the data are written sequentially within a zone. Controller 110 operates to appropriately align the data placement. The corresponding zones are laid sequentially as well and are of the type "Sequential Write Required." Each zone has certain attributes that enables the above-indicated functionality, e.g., including: (i) a write pointer that points to the next place to write sequentially; (ii) the zone starting logical block address (LBA) that points to the first LBA of the zone; (iii) the zone capacity, which specifies the number of writable LBAs; and (iv) the zone state that defines the read/write access rules. The zone size within a particular namespace is typically fixed and applies to all zones in the namespace. The zone capacity, i.e., number of writable LBAs within a specific zone, is typically fixed, but the ZNS specification does not preclude the use of variable-capacity zones. Each zone has a respective state machine associated therewith. Depending on the state of the state machine, the LBAs may or may not be read or written. The state machine transitions between states, e.g., on writes, zone management commands (e.g., reset zone), and device shutdowns. Active and open resources may limit how many zones can be in specific states at the same time.

Figure 2:
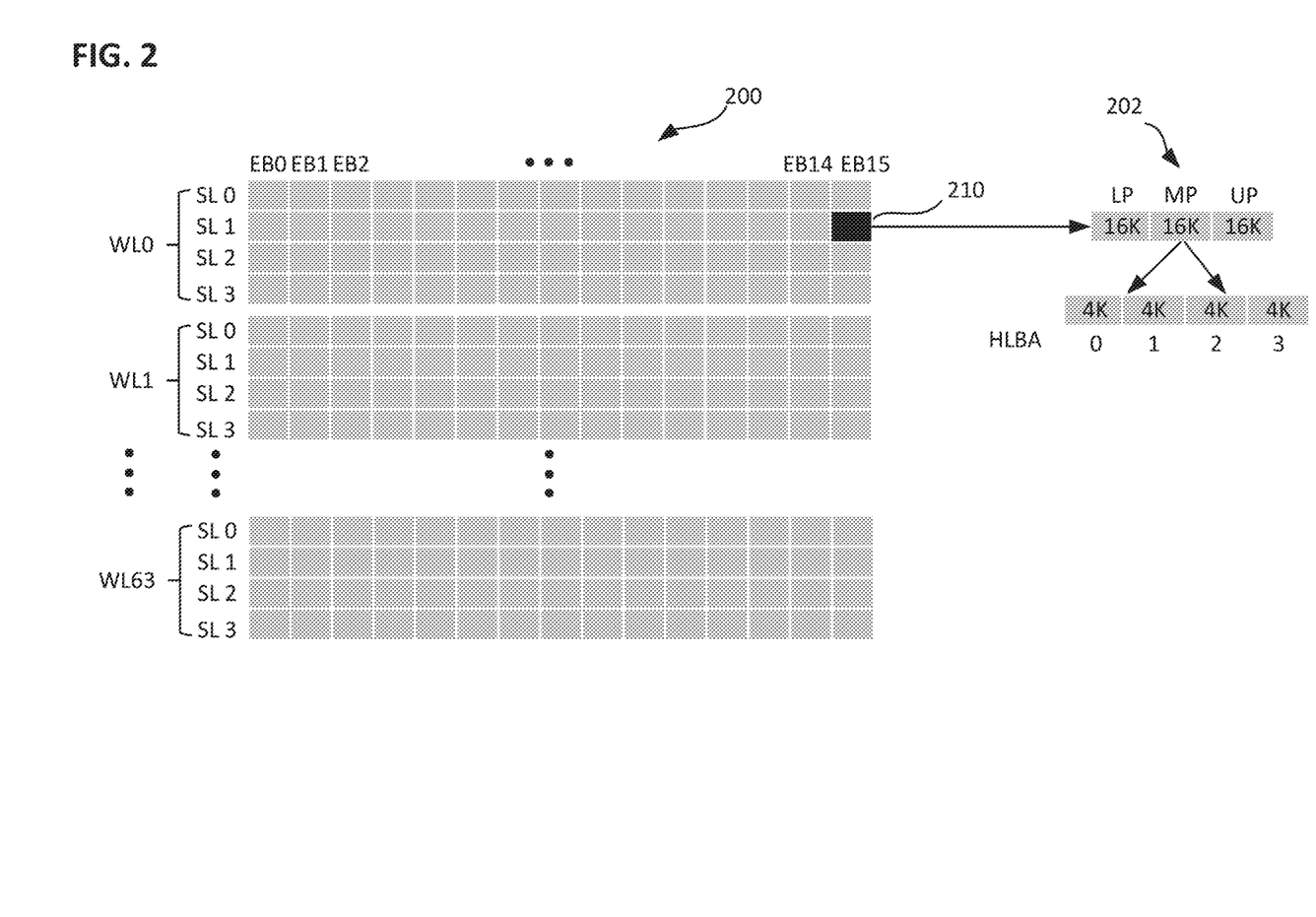
FIG. 2 is a block diagram illustrating a superblock layout that can be used in the data-storage system of FIG. 1 according to an embodiment.

FIG. 2 is a block diagram illustrating an example superblock layout 200 that can be used in data storage device 102 according to an embodiment. In alternative embodiments, other layouts can also be used. For example, some or all numerical values indicated in FIG. 2 may be different in an alternative superblock layout.

According to the layout 200, a corresponding superblock has 16 erase blocks (EBs), labeled EB0, EB1, EB15. Each EB is connected to 64 word lines, labeled WL0, WL1, WL63. Each word line (WL) includes four respective string lines, labeled SL0, SL1, SL2, SL4. Each of the 16 EB includes 256 respective string-line (SL) blocks, one of which is labeled 210 and shown in more detail in an expansion diagram 202 shown in FIG. 2. In the shown example, SL block 210 has the size of 48 kB and is logically partitioned into three (lower, middle, and upper) 16-kB portions labeled LP, MP, and UP, respectively. The LP, MP, and UP portions are also referred to as page types. Each of the page types has four pages and can hold data corresponding to four 4-kB host LBAs (HLBAs) labeled HLBA 0, 1, 2, 3, respectively. Layout 200 has a total of 4,096 SL blocks analogous to the SL block 210.

In an example embodiment, each ZNS zone is mapped to a corresponding superblock in the physical space of NVM 130, with the superblock being organized according to the layout 200. Sequential writes in compliance with the ZNS specification are implemented based on the superblock layout 200 in a row-by-row manner. For example, the storage space corresponding to the first row of the layout 200 located at WL0/SL0 is first filled with data until all constituent SL blocks are sequentially filled up. Then, the storage space corresponding to the second row of the layout 200 located at WL0/SL1 is filled with data until all constituent SL blocks are sequentially filled up, and so on.

In an example embodiment, a physical address within layout 200 is provided using a combination of the EB number, WL number, SL number within the corresponding word line, page type within the corresponding SL block, and page offset (PO) within the corresponding page type. For example, for HLBA 2 corresponding to the MP portion of the string-line block 210, the physical address can be provided as the following combination of partial physical addresses: (physical address of EB15) and (WL0, SL1, MP, PO2). A person of ordinary skill in the art will readily understand that physical addresses for other HLBAs can similarly be provided using analogous combinations of partial physical addresses.

According to a superblock layout analogous to the layout 200, a superblock of NVM 130 includes a first fixed number, $N_1$, of erase blocks. Each of the erase blocks includes a second fixed number, $N_2$, of SL blocks. Each of the SL blocks includes a third fixed number, $N_3$, of page types. Each of the page types includes a fourth fixed number, $N_4$, of pages. For the layout 200 shown in FIG. 2: $N_1=16$, $N_2=256$, $N_3=3$, and $N_4=4$. As already mentioned above, these values of $N_1$, $N_2$, $N_3$, and $N_4$ are mere examples, and other values of $N_1$, $N_2$, $N_3$, and $N_4$ can similarly be used.

Figure 3:
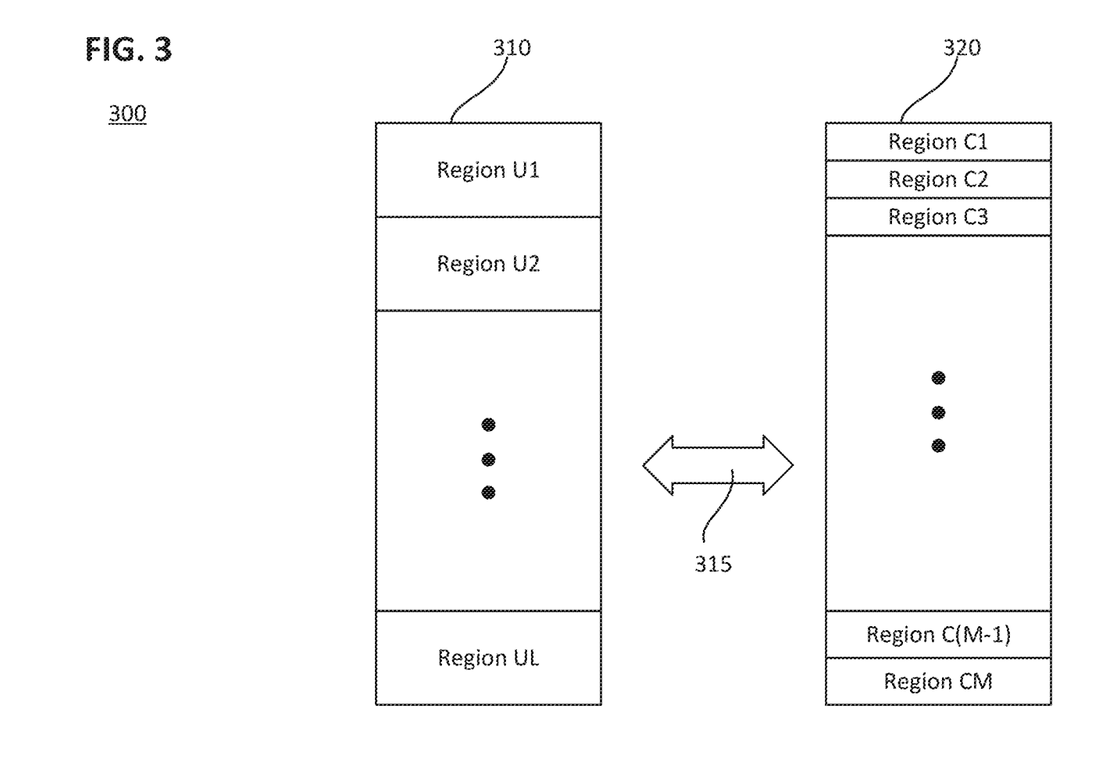
FIG. 3 is a block diagram illustrating an L2P table that can be used in the data-storage system of FIG. 1 according to an embodiment.

FIG. 3 is a block diagram illustrating an L2P table 300 that can be used in the data storage device 102 according to an embodiment. L2P table 300 includes a first L2P table 310 and a second L2P table 320. The first L2P table 310 can be referred to as an uncompacted L2P table and is typically stored in DRAM 150 or in the built-in cache memory of controller 110. In some examples, L2P table 310 is a part of L2P table 160. In some other examples, L2P table 310 is stored in a corresponding control-data partition of NVM 130. The second L2P table 320 can be referred to as a compacted L2P table and is typically stored in a corresponding control-data partition of NVM 130. In some examples, L2P table 320 is another part of L2P table 160. L2P tables 310 and 320 have different respective granularities as explained in more detail below.

L2P table 310 includes L regions, which are labeled in FIG. 3 as Region U1, Region U2, . . . , Region UL, where L is a positive integer. Each of the regions U1, . . . , UL corresponds to a ZNS zone of data storage device 102 mapped to a respective superblock in the physical space of NVM 130. In an example configuration of L2P table 310, the number L is three times larger than the maximum number of open ZNS zones allowed by controller 110. An example value of L is L=42 (=3×14) when the maximum of 14 open ZNS zones is allowed by controller 110. In other configurations of L2P table 310, other values of L can also be used.

In general, the value of L is a design parameter selected such that the L2P table 310 can provide sufficient space for performing dynamic sub-table transfers between the L2P tables 310 and 320, which transfers are schematically indicated in FIG. 3 by a double-headed block arrow 315. For example, compaction of an L2P sub-table stored in region Ul (where l=1, 2, . . . , L) of the L2P table 310 and transfer of the resulting compacted L2P sub-table into a region Cm (where m=1, 2, . . . M) of the L2P table 320 takes time to complete. The extra regions Ul of the L2P table 310 in excess of the maximum allowed number of open ZNS zones thus provide sufficient memory buffer capacity to complete the L2P sub-table transfer operations without impeding the ability of controller 110 to perform memory operations on the maximum allowed number of open ZNS zones.

L2P table 320 includes M regions, which are labeled in FIG. 3 as Region C1, Region C2, . . . , Region CM, where M is a positive integer greater than L (i.e., M>L). Typically, the number M is much greater than the number L (i.e., M>>L). In one possible configuration of L2P table 320, the number M is the same as the total number of ZNS zones in NVM 130. For example, for a 4-TB NVM 130 using the layout 200, the number M is M=20304, which is much greater than the number L=42. L2P table 320 has sufficient space to accommodate address entries of all ZNS zones of NVM 130, e.g., in situations where all ZNS zones are finished, and the corresponding L2P sub-tables are all compacted and transferred to the L2P table 320.

A region Ul of the L2P table 310 contains an L2P sub-table for the corresponding open ZNS zone, with the address entries thereof having a page-level granularity. That is, for each logical page number (e.g., page LBA) of the ZNS zone, the L2P sub-table of region Ul tracks a corresponding physical page address. As already indicated above, for the layout 200 (FIG. 2), the physical page address is provided by the respective combination of the physical address for the corresponding EB number and the sub-address sequence including the WL number, SL number, page type, and PO value.

Herein, the term "page" refers to the minimum readable/writable data unit of the superblock. For comparison, the minimum erasable unit of the superblock is an erase block EB, e.g., one of blocks EB0-EB15 (see FIG. 2), which is larger than the page. For example, in layout 200, an erase block EB has 768 pages and 3072 HLBAs. In NAND flash-based SSDs, before any data can be written or programmed to the SSD, an entire erase block of data that are no longer needed or valid are erased. An internal SSD housekeeping operation referred to as "garbage collection" or "GC" is used to manage and maintain the available storage space, handling the disparity between the erase unit size (erase block) and the read/write unit size (page). When a previously written block is targeted for garbage collection, the valid data pages are gathered up and moved to another erase block so that the erase block containing the invalid data pages can be fully erased. The L2P tables maintained by the controller 110 are then updated accordingly.

In an example embodiment, a region Cm of the L2P table 320 contains an L2P sub-table for the corresponding finished ZNS zone having an EB-level granularity. That is, for each logical page number of the finished ZNS zone, the L2P sub-table of region Cm tracks only the physical address of the corresponding erase block EB. Thus, the WL number, SL number, page type, and PO value are not being explicitly tracked by the L2P sub-table of the region Cm of L2P table 320. Nevertheless, the WL number, SL number, page type, and PO value can be recomputed, as explained below, based on the host LBA and certain zone attributes, thereby enabling the controller 110 to obtain the full respective physical address.

In other examples, the L2P table 310 can have a granularity that is different from the above-described page-level granularity. For example, a logical-block size representing the granularity of the L2P table 310 may be larger than the page size but still smaller than the EB size. An example of such logical block-size is the SL-block size. In various examples, the L2P table 310 has a finer granularity than the L2P table 320. This characteristic can also be stated by saying that the L2P table 320 has a coarser granularity than the L2P table 310. The coarser granularity of the L2P table 320 advantageously enables significant effective size reduction for the full L2P table of a ZNS-compliant data storage device 102 compared to that of conventional L2P tables.

Sub-table transfers 315 between the L2P tables 310 and 320 are performed in accordance with the above-mentioned ZNS state machine(s) run by the controller 110. The state machine controls the operational characteristics of each ZNS zone and typically has the following zone states: empty, opened (implicitly or explicitly), closed, full, read only, and offline. Various valid zone-state transitions are described in more detail in the above-cited Specification TP-4053. A transfer 315 is typically triggered by a transition between the opened state and the full state of a zone. An opened zone can become full, e.g., when the host device 190 finishes writing the zone, either by writing the zone to capacity or by giving an explicit "finish zone" command. A full zone is reset before that zone can be written to again. When a full zone is reset, the region Cm associated with that zone is freed up. A closed zone can be opened, e.g., when the host device 190 issues a write command for the closed zone.

As already indicated above, the L2P table 310 has the L2P sub-tables of the opened ZNS zones in the respective regions Ul thereof. When a zone transitions from the opened state to the full state, the L2P sub-table of the corresponding region Ul of the L2P table 310 is compacted, e.g., from the page-level granularity to the EB granularity, and a transfer 315 is performed to place the resulting compacted L2P sub-table into a corresponding region Cm of the L2P table 320. The corresponding region Ul of the L2P table 310 can then be made available for hosting the uncompacted L2P sub-table of a different opened ZNS zone. The L2P table 320 has the L2P sub-tables of the full ZNS zones in the respective regions Cm thereof.

Figure 4:
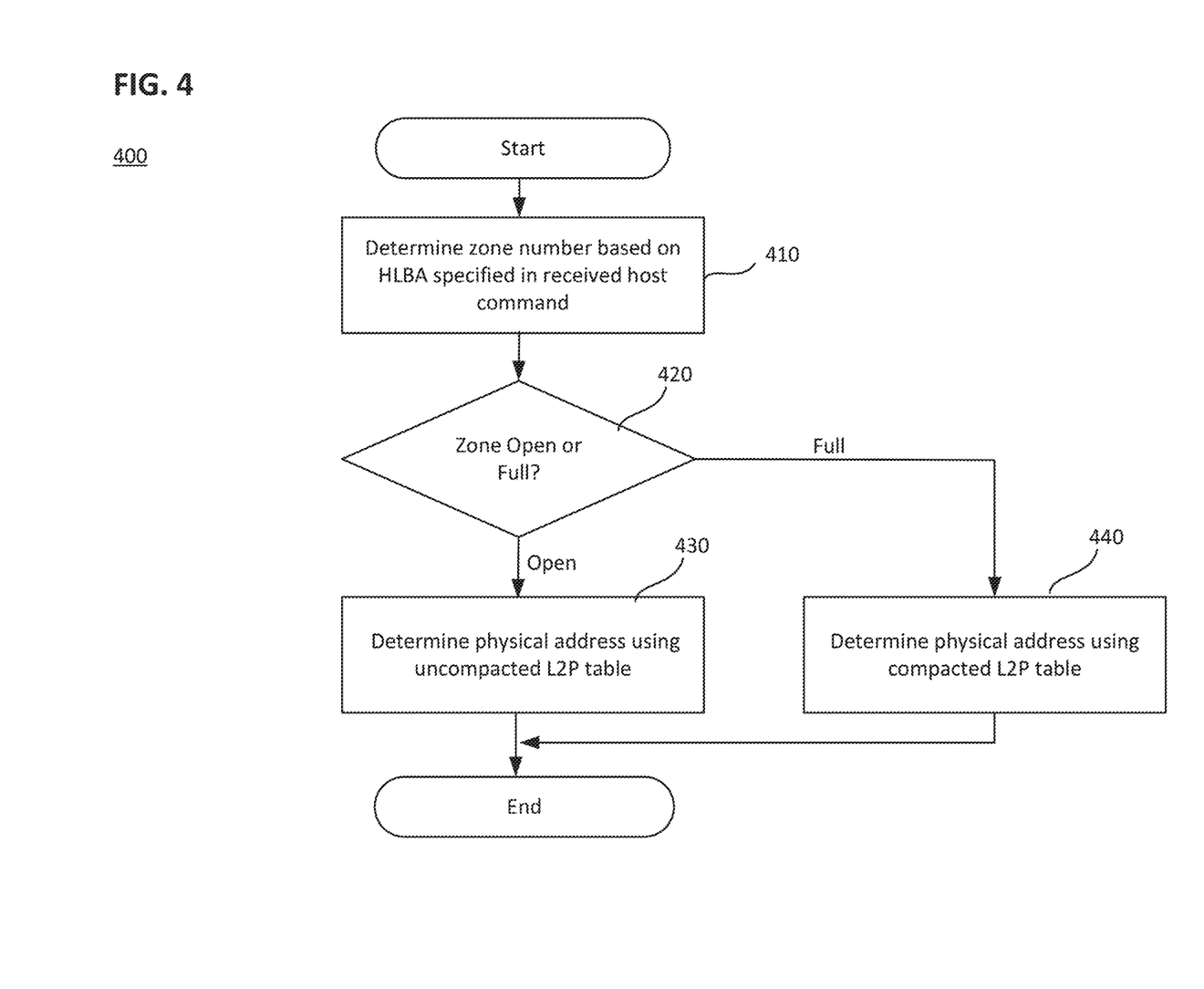
FIG. 4 is a flowchart illustrating an L2P address-translation method that can be used in the data-storage system of FIG. 1 according to various embodiments.

FIG. 4 is a flowchart illustrating an L2P address-translation method 400 according to various embodiments. Method 400 is implemented using controller 110 of a ZNS-compliant data storage device 102. Various embodiments of method 400 provide L2P address-translation using L2P tables of a structure similar to that of L2P table 300 (FIG. 3).

Method 400 includes the controller 110 receiving a host command (at block 410). The host command typically specifies a pertinent HLBA. Method 400 further includes the controller 110 identifying the corresponding ZNS zone based on the HLBA of the received host command (at block 410). The zone identification can be, for example, in the form of a zone number determined based on the HLBA.

In an example embodiment, the zone identification of block 410 can be performed based on the zone attributes reported in a Zone Descriptor data structure. The zone attributes reported in the Zone Descriptor data structure include, inter alia, the Zone State, Zone Start LBA, and Zone Capacity. Thus, using the values of the Start LBA and Zone Capacity found in the zone attributes, controller 110 can identify the zone based on the HLBA in a straightforward manner at block 412.

Method 400 includes the controller 110 determining whether the zone state is open or full (at decision block 420). This determination can be made based on the Zone State attribute of the Zone Descriptor data structure of the zone identified in block 410. Depending on whether the zone is open or full (or finished), the controller 110 invokes operations at block 430 or block 440.

When the controller 110 determines that the zone is open ("Open" at decision block 420), method 400 includes the controller 110 determining the physical address corresponding to the HLBA of the host command using the L2P table 310 (at block 430). As already indicated above, in an example embodiment, the L2P table of the corresponding region U1 of the L2P table 310 tracks the LBAs with a fine (e.g., page-level) granularity. As such, a lookup operation for the HLBA of the host command will typically fetch the corresponding full physical address from the L2P table 310 (at block 430).

When the controller 110 determines that the zone is full ("Full" at decision block 420), method 400 includes the controller 110 determining the physical address corresponding to the HLBA of the host command using the L2P table 320 (at block 440). As already indicated above, the L2P table of the corresponding region Cm of the L2P table 320 tracks the LBAs with the EB granularity. As such, a lookup operation for the HLBA of the host command will fetch the corresponding EB physical address from the L2P table 320 (at block 440). Block 440 also includes the controller 110 performing calculations to determine the WL number, SL number, page type, and PO value corresponding to the HLBA of the host command. An example of such calculations is described in more detail below in reference to FIG. 5. Block 440 further includes the controller 110 combining the EB physical address fetched from the L2P table 320 and the calculated WL number, SL number, page type, and PO value to determine the full physical address corresponding to the HLBA of the host command.

Figure 5:
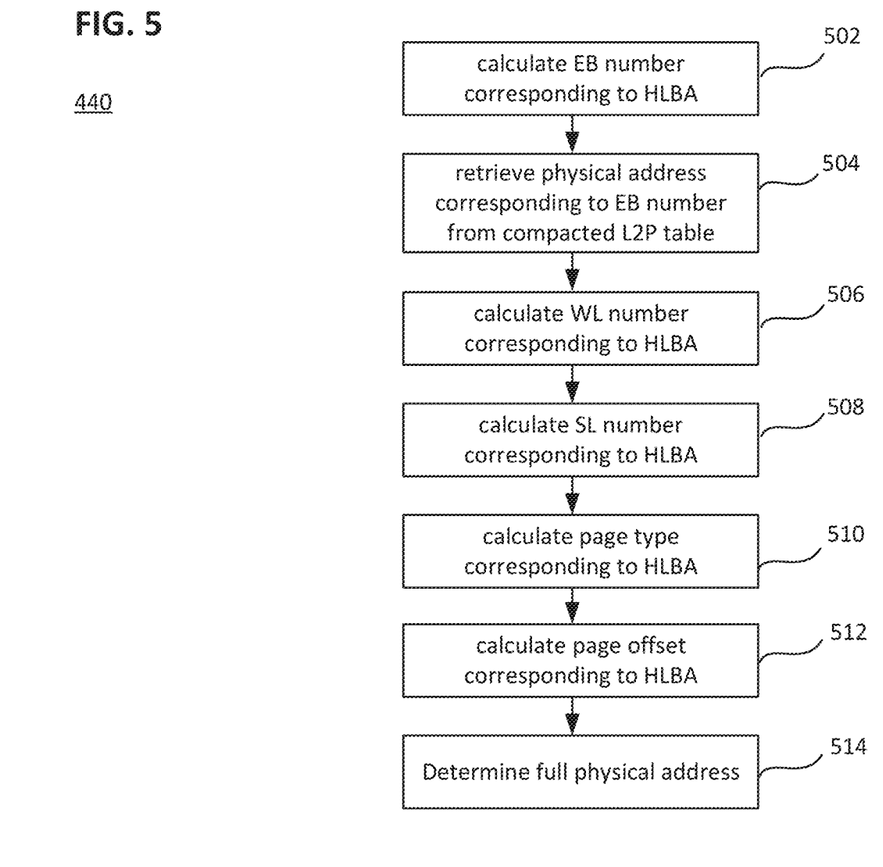
FIG. 5 is a flowchart illustrating a part of the L2P address-translation method of FIG. 4 according to an embodiment.

FIG. 5 is a flowchart illustrating block 440 of method 400 according to an embodiment. For illustration purposes and without any implied limitations, block 440 is described in reference to an embodiment of data storage device 102 employing the superblock layout 200 (FIG. 2). Based on the provided description, a person of ordinary skill in the pertinent art will be able to make and use other embodiments employing other superblock layouts without undue experimentation.

Block 440 includes the controller 110 calculating the EB number corresponding to the HLBA of the host command (at subblock 502). In an example embodiment, the EB number (EB num) is calculated using Eq. (1):

$$\text{EB num} = ((\text{HLBA} - O_1)/(N_3 \times N_4)) \bmod N_1 \qquad (1)$$

where $N_1$ is the number of erase blocks in the corresponding superblock; $N_3$ is the number of page types; $N_4$ is the number of pages per page type; and $O_1$ is a fixed offset. For the example of layout 200 (FIG. 2), $N_1=16$ and $(N_3 \times N_4)=12$. The value of $O_1$ depends on the Start LBA of the corresponding zone. In some examples, $O1=0$.

Block 440 includes the controller 110 retrieving the physical address corresponding to the EB number calculated at subblock 502 from the L2P table 320 (at subblock 504). As already indicated above, the L2P table 320 has the EB granularity. As such, the physical address corresponding to the EB number calculated at subblock 502 can be retrieved from the L2P table 320 using a lookup operation.

Block 440 includes the controller 110 calculating the WL number corresponding to the HLBA of the host command (at subblock 506). In an example embodiment, the WL number (WL num) is calculated using Eq. (2):

$$\text{WL num} = ((\text{HLBA} - O_1)/(N_1 \times N_3 \times N_4))/N_5 \qquad (2)$$

where $N_5$ is the number of strings SL in a word line WL of the corresponding superblock. For the example of layout 200 (FIG. 2), $N_5=4$.

Block 440 includes the controller 110 calculating the SL number corresponding to the HLBA of the host command (at subblock 508). In an example embodiment, the SL number (SL num) is calculated using Eq. (3):

$$\text{SL num} = ((\text{HLBA} - O_1)/(N_1 \times N_3 \times N_4)) \bmod N_5 \qquad (3)$$

Block 440 includes the controller 110 calculating the page type corresponding to the HLBA of the host command (at subblock 510). In an example embodiment, the page type is calculated using Eq. (4):

$$\text{Page type} = ((\text{HLBA} - O_1)/(N_3 \times N_4)) \bmod N_3 \qquad (4)$$

The numerical page-type identifiers for the LP, MP, and UP page types are 0, 1, and 2, respectively.

Block 440 includes the controller 110 calculating the page offset (PO) value corresponding to the HLBA of the host command (at subblock 512). In an example embodiment, the PO value is calculated using Eq. (5):

$$\text{PO} = (\text{HLBA} - O_1) \bmod N_4 \qquad (5)$$

For the example of layout 200 (FIG. 2), $N_4=4$. The numerical PO values are 0, 1, 2, and 3, respectively (also see FIG. 2).

Block 440 includes the controller 110 determining the full physical address corresponding to the HLBA of the host command (at subblock 514) based on the values obtained at subblocks 504-512. For example, the full physical address can be obtained by concatenating the EB physical address retrieved from the L2P table 320 at subblock 504, the WL number calculated at subblock 506, the SL number calculated at subblock 508, the page-type identifier calculated at subblock 510, and the PO value calculated at subblock 512.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

"SUMMARY" in this specification is intended to introduce some example embodiments, with additional embodiments being described in "DETAILED DESCRIPTION" and/or in reference to one or more drawings. "SUMMARY" is not intended to identify essential elements or features of the claimed subject matter, nor is it intended to limit the scope of the claimed subject matter.

"ABSTRACT" is provided to allow the reader to quickly ascertain the nature of the technical disclosure. It is submitted with the understanding that it will not be used to interpret or limit the scope or meaning of the claims. In addition, in the foregoing "DETAILED DESCRIPTION," it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into "DETAILED DESCRIPTION," with each claim standing on its own as a separately claimed subject matter.

What is claimed is:

1. A data storage device, comprising:
a nonvolatile memory having a plurality of superblocks thereof mapped to a plurality of zones, each of the plurality of zones being of a type requiring sequential write of host data, an erase block being a minimum erasable unit of the plurality of superblocks; and a controller coupled to the nonvolatile memory and configured to perform logical-to-physical (L2P) address translation using a first L2P table and a second L2P table;

wherein the first L2P table includes one or more first L2P sub-tables, each of the one or more first L2P sub-tables having a first granularity and assigned to a respective open zone of the plurality of zones;

wherein the second L2P table includes one or more second L2P sub-tables, each of the one or more second L2P sub-tables having an erase-block granularity and assigned to a respective full zone of the plurality of zones, the first granularity being finer than the erase-block granularity;

wherein the controller is configured to perform a compacting sub-table transfer from the first L2P table to the second L2P table in response to detecting a finishing of the respective open zone; and wherein the controller is configured to perform the L2P address translation of a host logical address by obtaining a corresponding sub-address combination including:
- a physical address of a corresponding erase block;
- a corresponding word-line number;
- a corresponding string-line number;
- a corresponding page-type identifier; and
- a corresponding page offset.

2. The data storage device of claim 1,
wherein a page is a minimum writable unit of the plurality of superblocks; and
wherein the first granularity is a page-level granularity.

3. The data storage device of claim 1,
wherein each of the plurality of superblocks includes a first fixed number of erase blocks;
wherein each of the first fixed number of the erase blocks includes a second fixed number of string-line (SL) blocks;
wherein each of the second fixed number of the SL blocks includes a third fixed number of page types; and
wherein each of the third fixed number of the page types includes a fourth fixed number of pages.

4. The data storage device of claim 1, wherein, for a logical address of the respective open zone, a corresponding one of the one or more first L2P sub-tables has:
the physical address of the corresponding erase block; and
at least one of the corresponding word-line number; the corresponding string-line number; the corresponding page-type identifier; and the corresponding page offset.

5. The data storage device of claim 4, wherein the compacting sub-table transfer includes the controller removing said at least one of the corresponding word-line number; the corresponding string-line number; the corresponding page-type identifier; and the corresponding page offset from the corresponding one of the one or more first L2P sub-tables.

6. The data storage device of claim 1,
wherein, for a logical address of the respective full zone, a corresponding one of the one or more second L2P sub-tables has the physical address of the corresponding erase block; and
wherein the controller is configured to obtain the corresponding sub-address combination by:
retrieving the physical address of the corresponding erase block from the corresponding one of the one or more second L2P sub-tables;
calculating the corresponding word-line number, the corresponding string-line number, the corresponding page-type identifier, and the corresponding page offset based on the host logical address; and
combining the physical address that is retrieved with the corresponding word-line number, the corresponding string-line number, the corresponding page-type identifier, and the corresponding page offset that are calculated.

7. The data storage device of claim 6, wherein the controller is further configured to:
calculate an erase-block number corresponding to the logical address of the respective full zone; and
look up the physical address of the corresponding erase block in the corresponding one of the one or more second L2P sub-tables using the erase-block number that is calculated.

8. The data storage device of claim 6, wherein the controller is configured to calculate the corresponding word-line number (WL num) based on a mathematical relationship expressed as:

$$\text{WL num} = ((\text{HLBA} - O_1)/(N_1 \times N_3 \times N_4))/N_5$$

where HLBA is the host logical address; $N_1$ is a number of erase blocks in a superblock of the plurality of superblocks; $N_3$ is a number of page types; $N_4$ is a number of pages per page type; $N_5$ is a number of string lines per word line; and $O_1$ is a fixed offset.

9. The data storage device of claim 6, wherein the controller is configured to calculate the corresponding string-line number (SL num) based on a mathematical relationship expressed as:

$$\text{SL num} = ((\text{HLBA} - O_1)/(N_1 \times N_3 \times N_4)) \bmod N_5$$

where HLBA is the host logical address; $N_1$ is a number of erase blocks in a superblock of the plurality of superblocks; $N_3$ is a number of page types; $N_4$ is a number of pages per page type; $N_5$ is a number of string lines per word line; and $O_1$ is a fixed offset.

10. The data storage device of claim 6, wherein the controller is configured to calculate the corresponding page-type identifier (Page type ID) based on a mathematical relationship expressed as:

$$\text{Page type ID} = ((\text{HLBA} - O_1)/(N_3 \times N_4)) \bmod N_3$$

where HLBA is the host logical address; $N_3$ is a number of page types; $N_4$ is a number of pages per page type; and $O_1$ is a fixed offset.

11. The data storage device of claim 6, wherein the controller is configured to calculate the corresponding page offset (PO) based on a mathematical relationship expressed as:

$$\text{PO} = (\text{HLBA} - O_1) \bmod N_4$$

where HLBA is the host logical address; $N_4$ is a number of pages per page type; and $O_1$ is a fixed offset.

12. The data storage device of claim 1,
wherein, for a logical address of the respective full zone, a corresponding one of the one or more second L2P sub-tables only has the physical address of the corresponding erase block; and
wherein the de-compacting sub-table transfer includes:
the controller calculating the corresponding word-line number, the corresponding string-line number, the corresponding page-type identifier, and the corresponding page offset based on the logical address; and the controller combining the physical address with the corresponding word-line number, the corresponding string-line number, the corresponding page-type identifier, and the corresponding page offset that are calculated.

13. An address-translation method for a data storage device, the method comprising:
mapping a plurality of superblocks of a nonvolatile memory of the data storage device to a plurality of zones, each of the plurality of zones being of a type requiring sequential write of host data, an erase block being a minimum erasable unit of the plurality of superblocks;
performing logical-to-physical (L2P) address translation using a controller coupled to the nonvolatile memory and further using a first L2P table and a second L2P table, the first L2P table including one or more first L2P sub-tables, each of the one or more first L2P sub-tables having a first granularity and assigned to a respective open zone of the plurality of zones, the second L2P table including one or more second L2P sub-tables, each of the one or more second L2P sub-tables having an erase-block granularity and assigned to a respective full zone of the plurality of zones, the first granularity being finer than the erase-block granularity;
performing, via the controller, a compacting sub-table transfer from the first L2P table to the second L2P table in response to detecting a finishing of the respective open zone; and
performing, via the controller, the L2P address translation of a host logical address by obtaining a corresponding sub-address combination including:
a physical address of a corresponding erase block;
a corresponding word-line number;
a corresponding string-line number;
a corresponding page-type identifier; and
a corresponding page offset.

14. The method of claim 13,
wherein a page is a minimum writable unit of the plurality of superblocks; and
wherein the first granularity is a page-level granularity.

15. The method of claim 13, wherein said performing of the compacting sub-table transfer includes removing said at least one of the corresponding word-line number; the corresponding string-line number; the corresponding page-type identifier; and the corresponding page offset from the corresponding one of the one or more first L2P sub-tables.

16. The method of claim 13,
wherein, for a logical address of the respective full zone, a corresponding one of the one or more second L2P sub-tables only has the physical address of the corresponding erase block; and
wherein said performing the de-compacting sub-table transfer includes:

calculating the corresponding word-line number, the corresponding string-line number, the corresponding page-type identifier, and the corresponding page offset based on the logical address; and
combining the physical address with the corresponding word-line number, the corresponding string-line number, the corresponding page-type identifier, and the corresponding page offset that are calculated.

17. The method of claim 13,
wherein, for a logical address of the respective full zone, a corresponding one of the one or more second L2P sub-tables has the physical address of the corresponding erase block; and
wherein said performing the L2P address translation includes:
retrieving the physical address of the corresponding erase block from the corresponding one of the one or more second L2P sub-tables;
calculating the corresponding word-line number, the corresponding string-line number, the corresponding page-type identifier, and the corresponding page offset based on the host logical address; and
combining the physical address that is retrieved with the corresponding calculated word-line number, the corresponding string-line number, the corresponding page-type identifier, and the corresponding page offset that are calculated.

18. An apparatus, comprising:
means for mapping a plurality of superblocks of a nonvolatile memory to a plurality of zones, each of the plurality of zones being of a type requiring sequential write of host data therein, an erase block being a minimum erasable unit of the plurality of superblocks;
means for performing logical-to-physical (L2P) address translation using a first L2P table and a second L2P table, the first L2P table including one or more first L2P sub-tables, each of the one or more first L2P sub-tables having a first granularity and assigned to a respective open zone of the plurality of zones, the second L2P table including one or more second L2P sub-tables, each of the one or more second L2P sub-tables having an erase-block granularity and assigned to a respective full zone of the plurality of zones, the first granularity being finer than the erase-block granularity; and
means for performing a compacting sub-table transfer from the first L2P table to the second L2P table in response to detecting a finishing of the respective open zone,
wherein the means for performing L2P address translation are configured to perform the L2P address translation of a host logical address by obtaining a corresponding sub-address combination including:
a physical address of a corresponding erase block;
a corresponding word-line number;
a corresponding string-line number;
a corresponding page-type identifier; and
a corresponding page offset.

* * * * *